W. E. Lockwood.
Collar & Cuff.

No. 1983. Reissued June 6. 1865.

Witnesses:

Henry Houston

C. C. Foster

Inventor:

William E. Lockwood

UNITED STATES PATENT OFFICE.

WILLIAM E. LOCKWOOD, OF PHILADELPHIA, PENNSYLVANIA.

IMPROVEMENT IN LADIES' COLLARS AND CUFFS.

Specification forming part of Letters Patent No. 23,771, dated April 26, 1859; Reissue No. 1,983, dated June 6, 1865.

DIVISION E.

*To all whom it may concern:*

Be it known that I, WILLIAM E. LOCKWOOD, of Philadelphia, Pennsylvania, did obtain Letters Patent of the United States, dated April 26, 1859, for Improvements in Collars and Cuffs and Other Articles of Wearing-Apparel; that I deem the said patent inoperative and invalid by reason of a defective and insufficient specification, and that I declare the following to be a full, clear, and exact description of that part of the said invention which consists of an ornamental collar or cuff made of a fabric composed of paper and muslin, or an equivalent fabric, ornamented by the interlacing of colored ribbons or tapes.

In producing my improved manufacture, I use a fabric composed of paper and muslin, or an equivalent fabric, having a smooth and polished surface, to represent that of starched linen.

Figure 1:
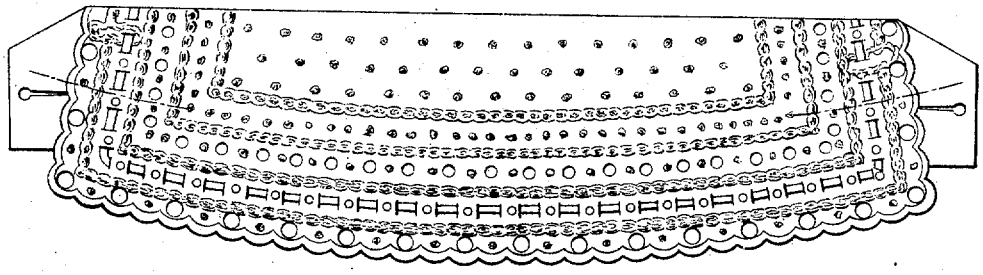

I cut from the fabric pieces of the size and shape of the desired collar, cuff, or other article of wearing-apparel, and make slits or openings in the same for receiving colored ribbons or tapes, as illustrated in Figure 1 of the accompanying drawings, the ribbon being so interlaced in the cuff or collars as to present on the surface patches of brilliant color.

Several ribbons of different colors may be used and interlaced with the collar or cuff at different points, according to the taste of the wearer.

Although the interlaced ribbon is in the present instance applied to an embossed cuff, it will be evident that it may be used in connection with plain collars or cuffs, or shirt-bosoms or other ornamental articles of wearing apparel made of the fabric alluded to.

Figure 2:
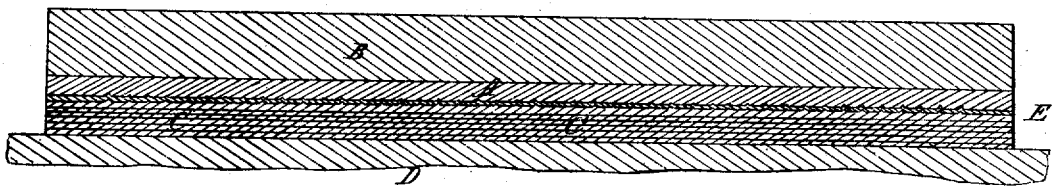

Fig. 2 of the drawings represents in section the dies used for embossing the collar or cuff, but as they have no relation to this part of my invention, a description of them will be unnecessary.

It will be evident that the invention is applicable to shirt-bosoms, &c.

I claim as my invention and desire to secure by Letters Patent—

As a new manufacture, an ornamental collar or cuff made of a fabric composed of paper and muslin, or of an equivalent fabric, ornamented by the interlacing of colored tapes or ribbons, as set forth.

In testimony whereof I have signed my name to this specification before two subscribing witnesses.

WILLIAM E. LOCKWOOD.

Witnesses:
HENRY HOWSON,
JOHN WHITE.